United States Patent [19]

Schneidersmann

[11] 4,108,496

[45] Aug. 22, 1978

[54] PADDLE WHEEL PICK-UP

[75] Inventor: Ernst-Otto Schneidersmann, Duisburg, Germany

[73] Assignee: DEMAG Aktiengesellschaft, Duisburg, Germany

[21] Appl. No.: 807,442

[22] Filed: Jun. 17, 1977

[30] Foreign Application Priority Data

Jun. 26, 1976 [DE] Fed. Rep. of Germany ....... 2628863

[51] Int. Cl.² ...................... E21C 27/24; E21C 35/20
[52] U.S. Cl. ...................................... 299/45; 299/18; 198/307; 37/80 A; 37/3
[58] Field of Search ................. 37/80 A, DIG. 16, 3, 37/32, 34 (U.S. only); 299/18, 45, 46, 54, 67, 75, 43, 44; 198/307; 214/9

[56] References Cited

U.S. PATENT DOCUMENTS

| | | | |
|---|---|---|---|
| 2,196,513 | 4/1940 | Adler | 37/80 A |
| 2,379,570 | 7/1945 | Friberg | 37/3 |
| 3,298,494 | 1/1967 | Pfeilschifter | 198/307 |
| 3,595,371 | 7/1971 | Smith | 198/307 |

Primary Examiner—Ernest R. Purser
Assistant Examiner—Nick A. Nichols, Jr.
Attorney, Agent, or Firm—Mandeville and Schweitzer

[57] ABSTRACT

The invention refers to a paddle wheel type pick-up device for loading stored piled bulk materials or the recovery of mined minerals. The pick-up arrangement is supported on the frame of a carriage parallel with the breakdown front of the stored pile, or mined surface and coordinated with a travelling beam, also hinged at the carriage frame, covering the breakdown front. The beam accommodates a cutting device.

7 Claims, 5 Drawing Figures

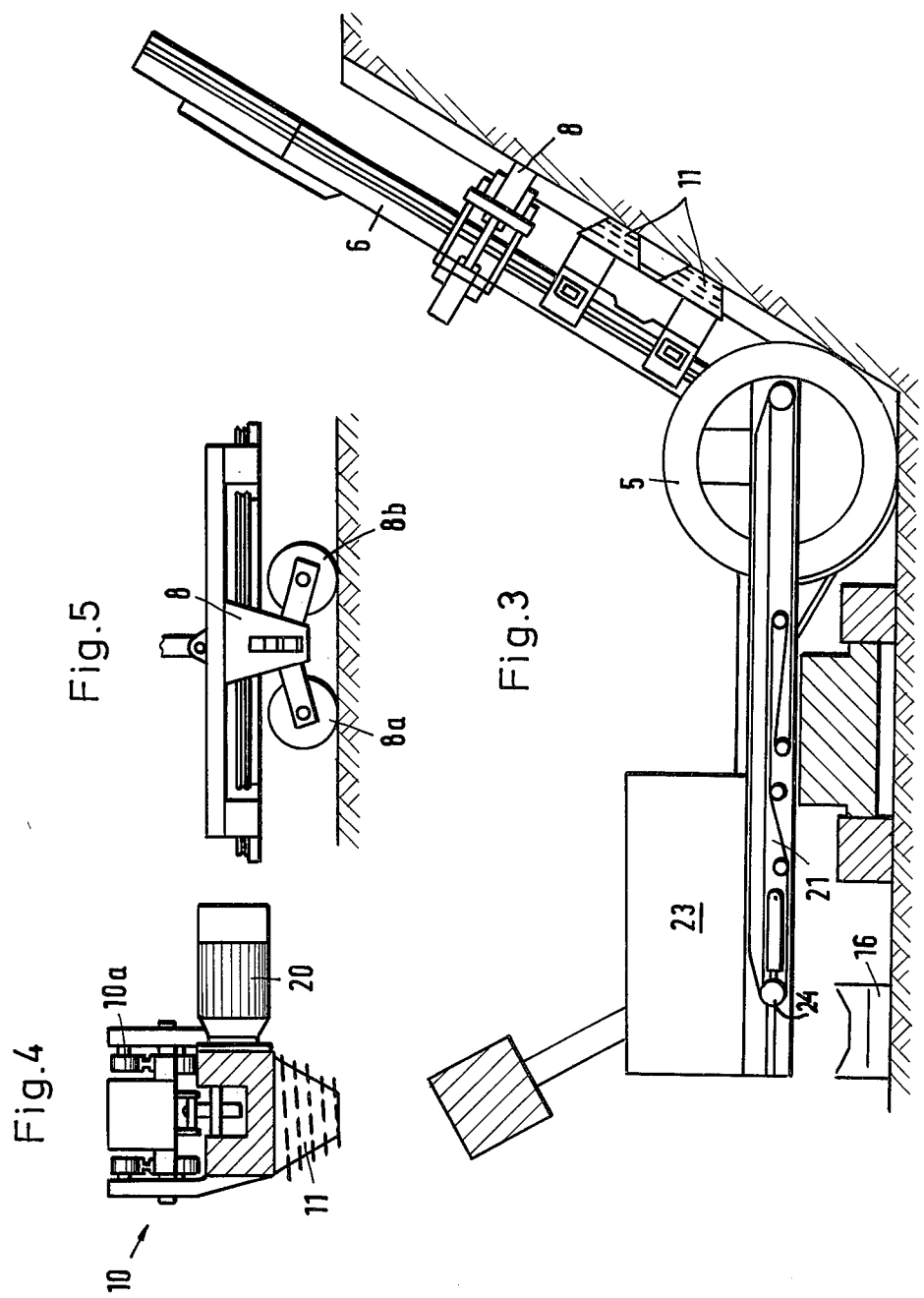

PADDLE WHEEL PICK-UP

BACKGROUND OF THE INVENTION

Paddle wheel pick-ups or similar devices used for the extraction of minerals and for re-loading of bulk materials fail, if the specific cutting stress exceeds a limit. Beyond such limit there is considerable wear on blades and teeth. Furthermore, the high cutting power, which can change with the frequency of the charge figure, can place too much stress on the carriage. In order to extract minerals of high stability in a continuous process, it is recommended to separate the cutting process from the pick-up process, and to transmit the cutting forces in the most direct way to a carriage of sufficient load-carrying capacity.

German Pat. No. 209 273 discloses a breakdown apparatus in the general sense of the present patent application, which is for use in strip mining, particularly for lignite mining. Such known apparatus, however, cannot be operated during the cutting process as the pick-up is arranged directly below the cantilever beam on which the cutting device travels. When operating the device, the material would fall behind the pick-up making it impossible to take it up. For this reason, the known apparatus mines the front in strips over its entire height, before the apparatus may be moved by one cutting width on the carriage. This procedure is very complicated and time-consuming, and precludes a continuous operation. Furthermore, the known apparatus has the disadvantage that the cutting device cannot travel into the area where the pick-up is located, so that the latter must be moved away for cutting. Materials which resist cutting entail the disadvantages already mentioned. Others of extreme rigidity make such procedure completely impossible.

STATEMENT OF THE INVENTION

It is, therefore, the object of this invention to improve upon a paddle wheel pick-up or similar device of the abovementioned type, so as to allow continuous operation, whereby the mobility of the apparatus is maintained with optimum stability and balance, and where high cutting efficiency is possible, even in the extraction of materials which are highly cut-resistant. This is solved by the invention in that the beam is arranged laterally, at least in the area of the pick-up, and in the travelling direction of the apparatus in front of the latter, and that the cutting device can be operated up to the travelling plane of the apparatus. Only then is it possible to operate the apparatus continuously during the cutting process, and thus attain steady breakdown. The cutting device frees the pick-up of the apparatus, thus relieving the great cutting forces on the pick-up so that the latter only serves to pick up the loosened material. The cut material always falls before the pick-up, and can therefore be taken up entirely.

Another feature of the invention is the provision of two beams on both sides of the pick-up, of which, preferably, only one is coordinated with the cutting device, while the latter can be alternated between the two beams.

When mining a saddle-like deposit it becomes necessary to have the apparatus travel in two directions along the mining front. As the beam, with cutting device, must, in each case, be arranged before the pick-up so that the loosened material falls in front of the pick-up, it is necessary for the return of the apparatus to arrange to beam in mirror image, or arrange two beams. When placing two beams in position it would also be required to arrange two cutting devices which would involve great expenditure. The device of the invention, therefore, arranges the cutting device in a way where it may be changed from one beam to the other.

Preferably, the beams form an acute angle whose sides include the pick-up, and in whose apex area provision is made for a track switching device used to change the cutting device from one beam to the other. This arrangement is considered favorable as it results in a most stable construction, facilitating the change-over of the cutting device in a very simple manner. To this end, the device to change the cutting device is developed as a switch, whose center of gravity lies in the apex of the acute angle formed by the beams. Such switching connection is tilted or realigned by means of power drives, whereby the cutting device is brought onto the switch and the switch pivoted to bring the cutting device into alignment with the other support beam.

Another feature of the invention provides the beam or beams with a support wheel resting on the material to be mined. This support wheel absorbs the weight of the beam or beams and the cutting device, thus preventing the apparatus from tilting onto the cutting tools. The weight of the beams and the cutting device is furthermore compensated for by a counter-weight on that side of the carriage facing away from the pick-up and the beam, because of the eccentric working point. Furthermore, provision is made that the pick-up and beam or beams may be set against the carriage in the direction of the mining front by at least the cutting depth of the cutting device.

DESCRIPTION OF THE DRAWINGS

FIG. 3 is a view in cross section along lines C-D of FIG. 2;

FIG. 4 is a view in cross section along lines E-F of FIG. 2; and

FIG. 5 is a view in cross section along lines G-H in FIG. 2.

DETAILED DESCRIPTION OF THE INVENTION

Figure 1:
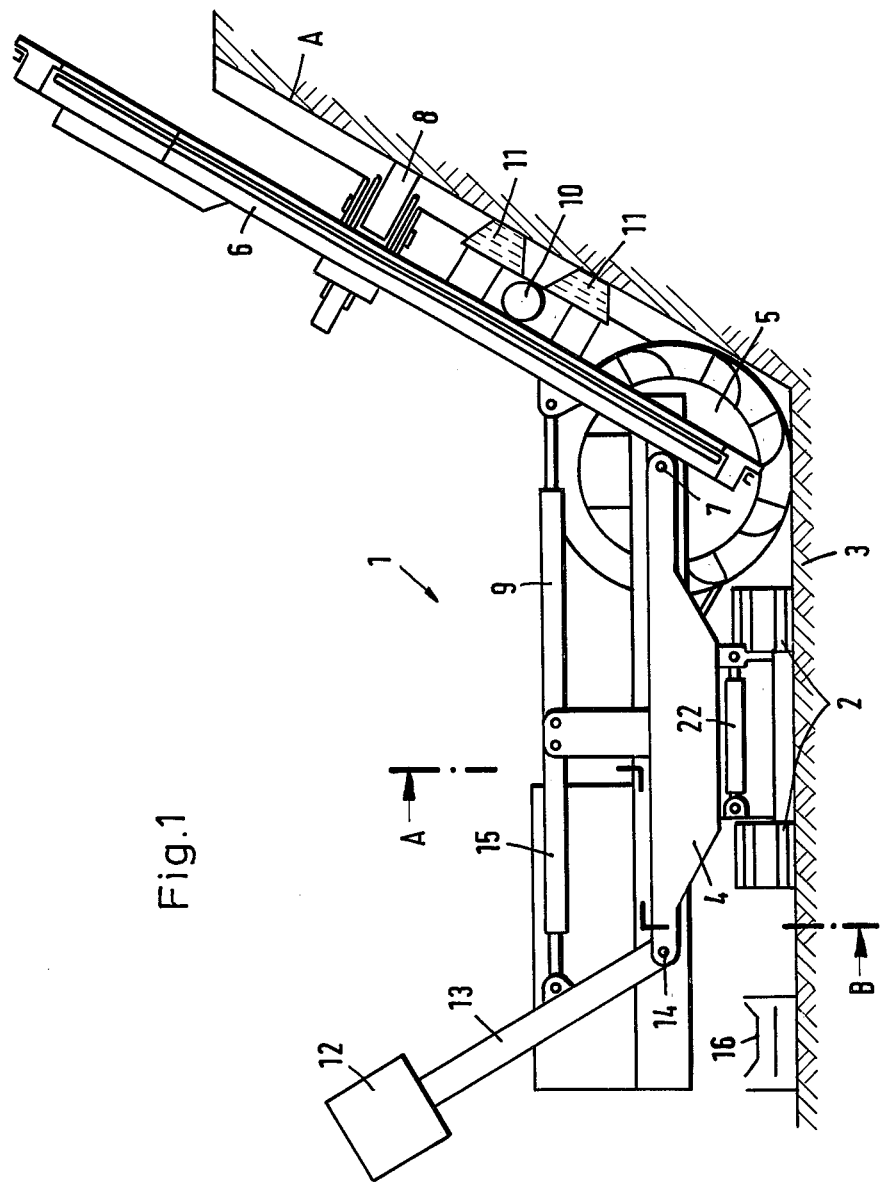
FIG. 1 is a somewhat diagrammatic side elevational view of apparatus embodying the invention.

In FIG. 1, 1 stands for the paddle wheel pick-up apparatus, which travels on plane 3 by means of caterpillar carriages 2. On the right-hand side of FIG. 1 A stands for the mining front, along which the apparatus travels for extraction or re-loading. The carriage frame 4 accommodates paddle wheel 5 to pick up the minerals or bulk materials, paddle wheel 5 being rotary driven. Also, beams 6 are hinged at carriage frame 4, pivoting around the horizontal axes 7, the pivoting motion being effected by means of piston-cylinder unit 9 engaging with beams 6. Beams 6 rest on mining front A by means of supporting device 8. Cutting device 10 travels along the beams, and cutting tools 11 for breaking down and extracting minerals or bulk materials, are rotary driven, and are attached to cutting device 10.

The side of apparatus 1 facing away from beams 6 is provided with counterweight 12 compensating for the weight of beams 6 and the paddle wheel, such counterweight 12 being arranged on a lever 13, which may be adjusted by means of piston cylinder unit 15 around a horizontal axis 14 in such a way that the center of gravity of the counter-weight may be altered.

Figure 2:
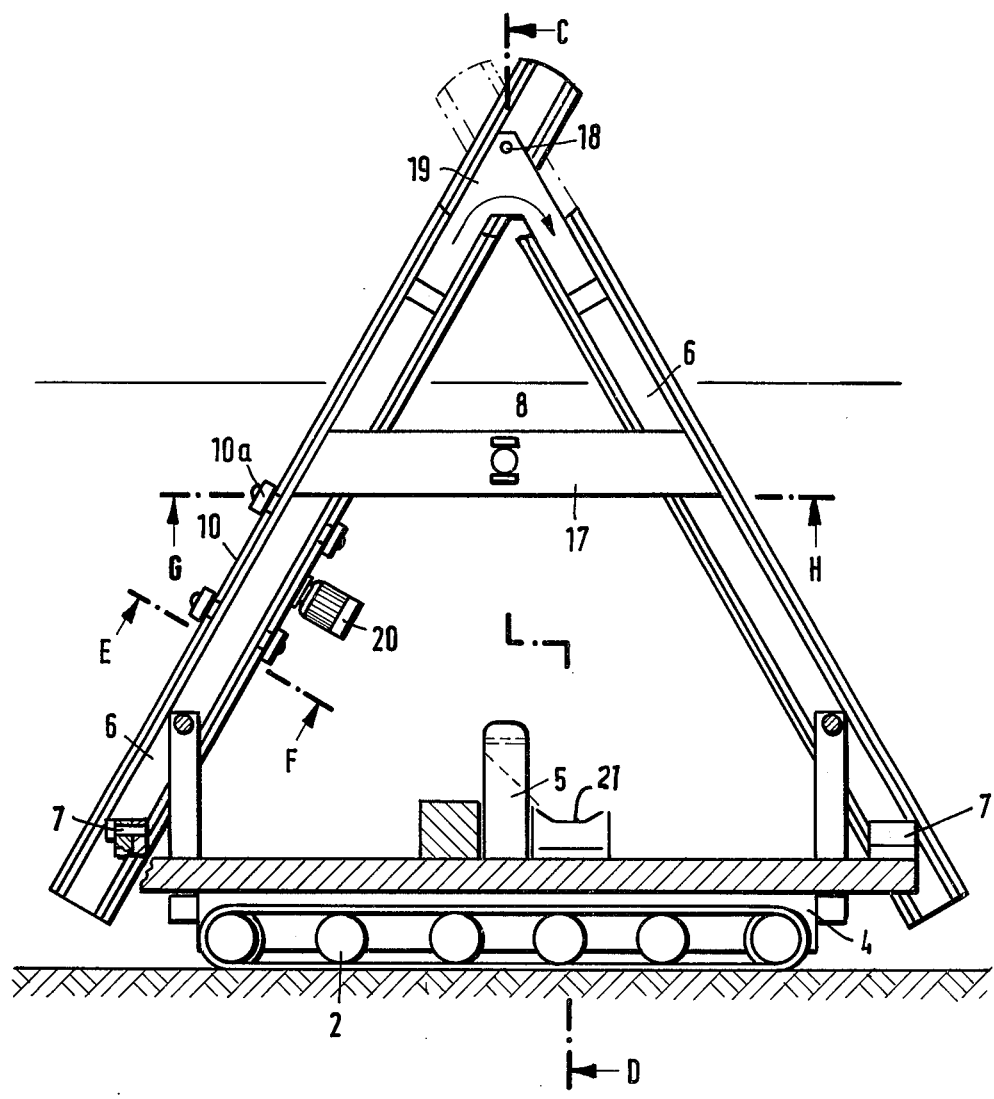
FIG. 2 is a view in cross section along lines A-B in FIG. 1.

In FIG. 2, like parts are marked alike. In FIG. 2, beams 6 are shown arranged in the form of an A, i.e. the beams form an acute angle whose apex is on top. For reinforcement and for accommodation of support 8, lateral support 17 is provided between beams 6. Track switch 19 for cutting device 10 pivoting around axis 18 is arranged in the apex area of acute-angled triangle formed by beams 6. Switch 19 can be brought into two positions, each of which is aligned with the longitudinal axis of one of beams 6. FIG. 2 also shows that the cutting device 10 moves on rollers 10a on beam 6, driven by electromotor 20.

Paddle wheel 5, as well as beams 6, can be adjusted vs. carriage 4 of apparatus 1 in the direction of the mining front by at least one cutting depth, such displacement being carried out by means of piston cylinder unit 22 (in FIG. 1). To this end, removal conveyor belt 21 (FIG. 3) transferring the material picked up to belt 16, is length-adjustable, too.

FIG. 4 shows a section through beam 6 looking towards cutting device 10.

FIG. 5 shows a section through lateral support 17, indicating that support device 8 consists of two support wheels 8a pivoting around a rocker.

In order to break down a bulk material pile or a deposit, the beams 6 are brought to such incline that the freed material flows to the foot of the slope, where it can be taken up by paddle wheel 5. In order to loosen the material, cutting device 10 moves back and forth along the beams with cutter heads 11, whereby the particular beam 6 is utilized which is located in front of paddle wheel 5 in the travel direction of apparatus 1. In this way the loosened materials always fall in front of paddle wheel 5. Cutting device 10 always moves up and down beam 6. During upward movement cutter head 11 must have a different cutting direction from its downward movement. Therefore, two counter-rotating cutter heads 11 are provided. It would, however, be conceivable also to provide a cutter head with doubly effective chisels. Beam 6 is designed so that cutting device 10 operates in the manner of container cranes suspended from a lower belt track. Also, in lieu of electric drive 20 a rope pulley could be used to move cutting device 10. The weight of cutting device 10 as well as beam 6 and paddle wheel 5 is absorbed by supporting device 8. While the apparatus moves along mining front A, device 8 rests on the two wheels 8a and 8b, arranged at a common rocker.

Hinge points 7 of beams 6, one of which is designed as a loose bearing, can be displaced across the travel direction of apparatus 1 by at least one cutting depth of the cutting device, this being effected by piston cylinder unit 22. This displacement is necessary to start the new cut after return of apparatus 1. During cross travel, the starting position is restored by steering the caterpillar carriages 2 of apparatus 1.

In the example shown, the counterweight 12 compensates for the weight of beams 6 and cutting device 10, so that when changing position of apparatus 1, beams 6 and counterweight 12 are moved into a position by means of retractable gears 9 and 15, which produce a favorable position of the center of gravity, and optimum transition profile. The paddle wheel, which also projects laterally, is, in the example shown, has as a counterweight electrocasing 23, and, in turn, auxiliary equipment. To circumvent the requirement of moving belt 16 with each cut, removal belt 21 is provided with a telescopic head 24.

I claim:

1. A material mining and removal apparatus comprising
   (a) a movable carriage;
   (b) a frame disposed on said carriage;
   (c) a rotatable pick-up wheel mounted on said frame and extending laterally to one side of said carriage toward a surface to be mined and engaging the mine floor; the improvement characterized by
   (d) a cutter supporting beam pivotally mounted on said frame adjacent said pick-up wheel and extending laterally toward said surface to be mined;
   (e) reversible power means disposed between said carriage and said supporting beam for pivoting said beam into position parallel to a surface to be mined;
   (f) a cutting device mounted on said supporting beam; and
   (g) power means on said cutting device for moving said cutting device along said beam toward and away from the supporting surface of said carriage and along said surface to be mined;
   (h) whereby material removed from a mining surface by said cutter falls into the path of said rotatable pick-up wheel.

2. The apparatus of claim 1, further characterized by
   (a) said supporting beam comprised of two beams with one each extending on each side of said pick-up wheel; and
   (b) said cutter device operable on either of said two supporting beams.

3. The apparatus of claim 2, further characterized by
   (a) said two supporting beams joined at the top to form an acute angle therebetween; and
   (b) means disposed at the apex of said supporting beams for moving said cutting device from one beam to another.

4. The apparatus of claim 3, further characterized by
   (a) said means for moving including a pivotal track switch; and
   (b) the pivot axis of said switch lying in the apex of said joined supporting beams.

5. The apparatus of claim 3, further characterized by
   (a) a connecting beam extending between said support beams; and
   (b) at least one support wheel disposed on said connecting beam for engaging a surface to be mined.

6. The apparatus of claim 1, further characterized by
   (a) a counterweight disposed on said carriage and extending laterally thereof on the side opposite said pick-up wheel and said supporting beam.

7. The apparatus of claim 1, further characterized by
   (a) said frame movably mounted on said carriage to displace said pick-up wheel and said supporting beam toward a surface to be mined at least the distance of the cutting depth of said cutting device.

* * * * *